(12) United States Patent
Takahara (10) Patent No.: US 8,456,657 B2
(45) Date of Patent: Jun. 4, 2013

(54) FACSIMILE DEVICE, COMPUTER READABLE RECORDING MEDIUM STORING CONTROL PROGRAM CODE FOR FACSIMILE DEVICE, AND CONTROL METHOD FOR FACSIMILE DEVICE REGARDING TRANSFER-SCHEDULED DATA AND PRINT-SCHEDULED DATA

(75) Inventor: Masakazu Takahara, Osaka (JP)

(73) Assignee: Kyocera Document Solutions Inc. (JP)

( * ) Notice: Subject to any disclaimer, the term of this patent is extended or adjusted under 35 U.S.C. 154(b) by 210 days.

(21) Appl. No.: 13/077,019

(22) Filed: Mar. 31, 2011

(65) Prior Publication Data
US 2011/0242573 A1    Oct. 6, 2011

(30) Foreign Application Priority Data
Mar. 31, 2010    (JP) .................................. 2010-083536

(51) Int. Cl.
G06F 3/12    (2006.01)
(52) U.S. Cl.
USPC ........................................ 358/1.13; 358/1.15
(58) Field of Classification Search
USPC ............................................... 358/1.13, 1.15
See application file for complete search history.

(56) References Cited

U.S. PATENT DOCUMENTS
2007/0124421 A1    5/2007  Tashiro et al.
2008/0244009 A1*  10/2008  Rand et al. .................... 709/206

FOREIGN PATENT DOCUMENTS
| JP | 61-255158   | 11/1986 |
| JP | 2002-254779 | 9/2002  |
| JP | 2003-338896 | 11/2003 |
| JP | 2007-096471 | 4/2007  |
| JP | 2007-288306 | 11/2007 |
| JP | 2009-303007 | 12/2009 |

* cited by examiner

*Primary Examiner* — Qian Yang
(74) *Attorney, Agent, or Firm* — McDonnell Boehnen Hulbert & Berghoff LLP (57) ABSTRACT

A facsimile device includes a communication unit, an analysis unit, and a printing unit. The communication unit is configured to receive, as reception data, both print-scheduled data to be printed and transfer-scheduled data to be transferred to an external device. The analysis unit is configured to analyze a target data portion of the reception data that requires an analysis in order to form an image. The printing unit is configured to print a printable part of the reception data. If at least one of a first error indicating that the communication unit did not receive part of the transfer-scheduled data as the reception data and a second error indicating that the analysis unit has failed in analyzing part of the target data portion corresponding to the transfer-scheduled data has occurred, the printing unit refrains from printing the reception data corresponding to the transfer-scheduled data.

20 Claims, 10 Drawing Sheets

FACSIMILE DEVICE, COMPUTER READABLE RECORDING MEDIUM STORING CONTROL PROGRAM CODE FOR FACSIMILE DEVICE, AND CONTROL METHOD FOR FACSIMILE DEVICE REGARDING TRANSFER-SCHEDULED DATA AND PRINT-SCHEDULED DATA

INCORPORATION BY REFERENCE

This application is based upon and claims the benefit of priority from the corresponding Japanese Patent Application No. 2010-083536, filed in the Japan Patent Office on Mar. 31, 2010, the entire contents of which is incorporated herein by reference.

BACKGROUND

1. Technical Field

The present disclosure relates to a facsimile device, a computer readable recording medium storing a control program code for a facsimile device, and a control method for a facsimile device.

2. Description of the Related Art

Typical facsimile devices have a transfer function of transferring received image data to an external device as well as a function of creating printed material based on the received image data.

Such a facsimile device may transfer the received image data to, for example, an arbitrary host connected to a network. However, if the facsimile device cannot normally transfer the received document to the host for a certain period of time due to a problem with the host as the transfer destination, a problem with network connection between the facsimile device and the host, and other such problem, the facsimile device automatically prints the received document and aborts the transfer.

Further, Internet facsimile in which image data is exchanged via the Internet is also used. In Internet facsimile, for example, a file of the image data is attached to an electronic mail and transmitted to a recipient.

Some facsimile devices that receive an Internet facsimile also have the transfer function. The facsimile device of this type transfers the attached image data to the transfer destination if the facsimile device itself can analyze the whole of the attached image data. If the facsimile device can analyze only part of the image data, on the other hand, the facsimile device prints the analyzable image data and aborts the transfer.

In the case of a typical facsimile device where printable image data is printed in the event of transfer failure, the sender and the recipient of the transferred data cannot immediately know of the transfer failure. Consequently, the printed material is left unattended. Then, a third person other than the recipient may view the printed material thus left unattended.

SUMMARY

A facsimile device according to an embodiment of the present disclosure includes a communication unit, an analysis unit, and a printing unit. The communication unit is configured to receive, as reception data, both print-scheduled data to be printed and transfer-scheduled data to be transferred to an external device. The analysis unit is configured to analyze a target data portion of the reception data that requires an analysis in order to form an image. The printing unit is configured to print a printable part of the reception data subject to an occurrence of one of a first and second error. The first error indicates that the communication unit did not receive part of the transfer-scheduled data as the reception data and the second error indicates that the analysis unit has failed in analyzing part of the target data portion corresponding to the transfer-scheduled data. The printing unit is further configured to refrain from printing the reception data corresponding to the transfer-scheduled data responsive to the occurrence of one of the first and second error.

A computer-readable recording medium according to the embodiment of the present disclosure stores a control program code executed by a computer of a facsimile device. The control program code includes first to third sub-program codes. The first sub-program code causes the computer to receive, as reception data, both print-scheduled data to be printed and transfer-scheduled data to be transferred to the external device. The second sub-program code causes the computer to analyze a target data portion of the reception data that requires an analysis in order to form an image. The third sub-program code causes the computer to print a printable part of the reception data subject to an occurrence of one of a first and second error. The first error indicates that part of the transfer-scheduled data is not received as the reception data and the second error indicates that the analysis of part of the target data portion corresponding to the transfer-scheduled data. The third sub-program code causes the computer to refrain from printing the reception data corresponding to the transfer-scheduled data responsive to the occurrence of one of the first and second error.

A control method for a facsimile device according to an embodiment of the present disclosure includes: (i) a communication unit receiving, as reception data, both print-scheduled data to be printed and transfer-scheduled data to be transferred to an external device; (ii) an analysis unit analyzing a target data portion of the reception data that requires an analysis in order to form an image; and (iii) a printing unit printing a printable part of the reception data subject to an occurrence of one of a first and second error, the first error indicating that the communication unit did not receive part of the transfer-scheduled data as the reception data and the second error indicating that the analysis unit has failed in analyzing part of the target data portion corresponding to the transfer-scheduled data, wherein the printing unit refrains from printing the reception data corresponding to the transfer-scheduled data responsive to the occurrence of one of the first and second error.

A facsimile device includes: communication means for receiving, as reception data, both print-scheduled data to be printed and transfer-scheduled data to be transferred to an external device; analysis means for analyzing a target data portion of the reception data that requires an analysis in order to form an image; and printing means for printing a printable part of the reception data subject to an occurrence of one of a first and second error, the first error indicating that the communication means did not receive part of the transfer-scheduled data as the reception data and the second error indicating that the analysis means has failed in analyzing part of the target data portion corresponding to the transfer-scheduled data, wherein the printing means is configured to refrain from printing the reception data corresponding to the transfer-scheduled data responsive to the occurrence of one of the first and second error.

Additional features and advantages are described herein, and will be apparent from the following Detailed Description and the figures.

DETAILED DESCRIPTION

Following description is given of an embodiment of the present disclosure with reference to the accompanying drawings.

Figure 1:
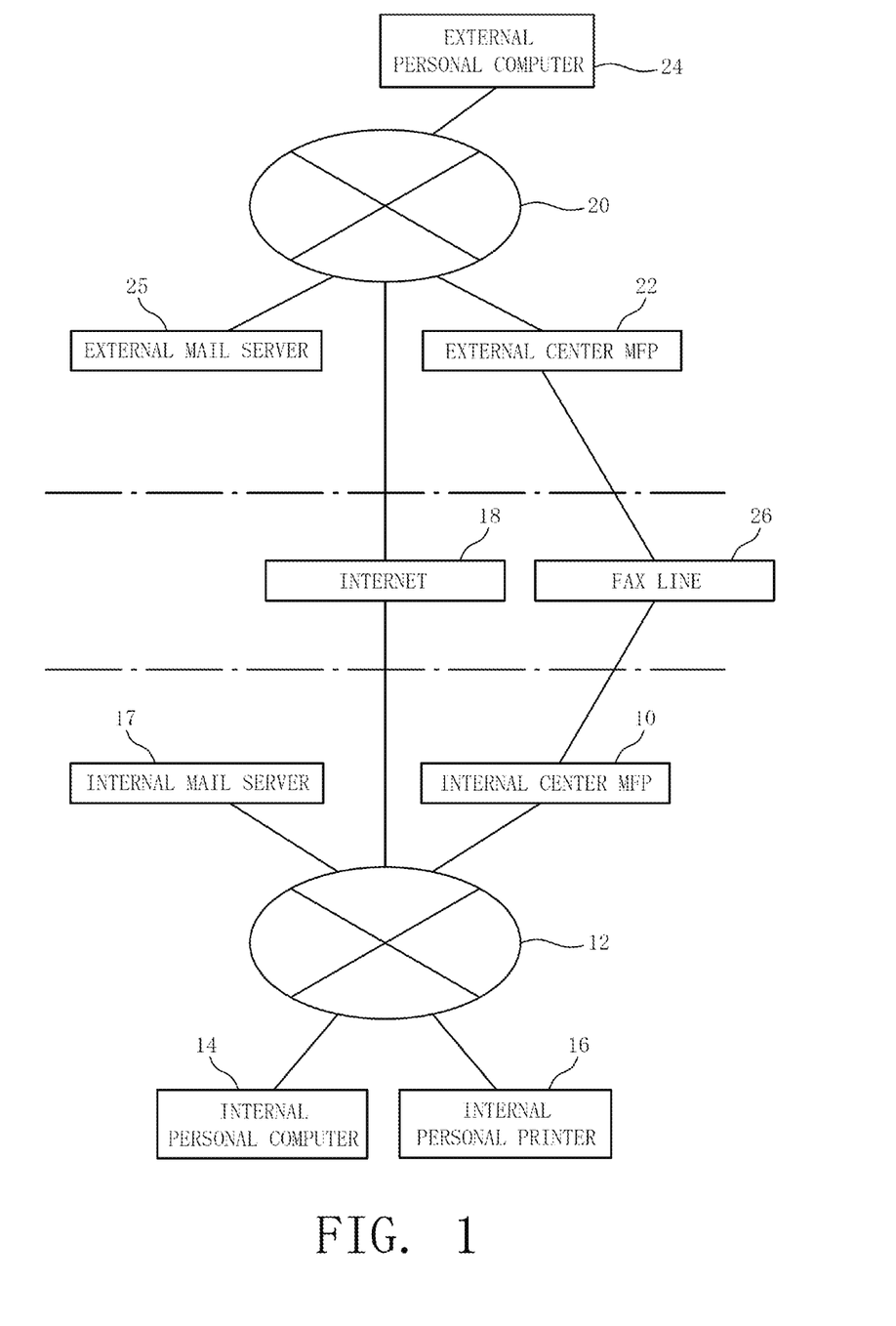
FIG. 1 shows a block diagram illustrating a schematic configuration of a communication system according to an embodiment of the present disclosure.

FIG. 1 shows a block diagram illustrating a schematic configuration of a communication system. The communication system includes internal center MFP (multi-function peripheral) 10 as a facsimile device according to an embodiment of the present disclosure.

Internal center MFP 10 has a function of a facsimile device, and also has functions of a scanner, a printer, and a copier. Internal center MFP 10 is connected to internal intranet 12. Electronic devices such as internal personal computer 14, internal personal printer 16, and internal mail server 17 may also be connected to internal intranet 12.

Internal intranet 12 is connected to external intranet 20 via Internet 18. Similar to the above, electronic devices such as external center MFP 22, external personal computer 24, and external mail server 25 are connected to external intranet 20. Further, internal center MFP 10 and external center MFP 22 are also connected to FAX line 26.

Figure 2:
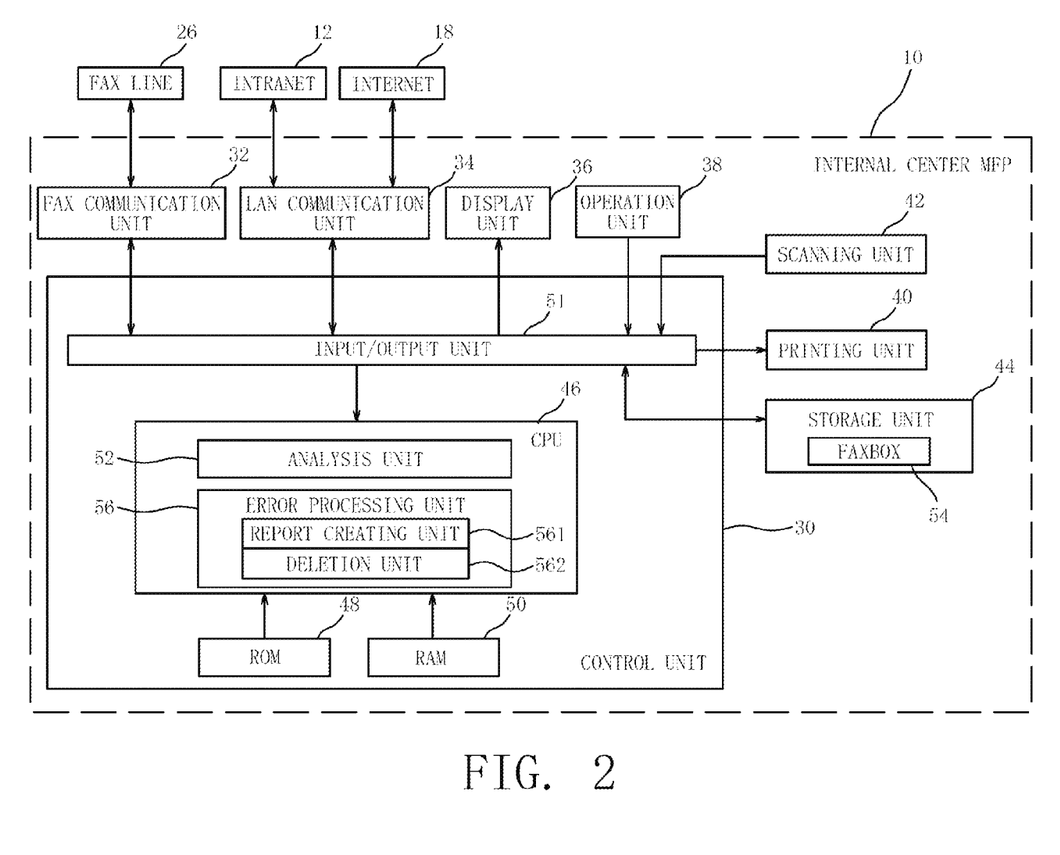
FIG. 2 shows a block diagram illustrating a schematic configuration of the internal center MFP.

FIG. 2 shows a block diagram illustrating a schematic configuration of internal center MFP 10. As illustrated in FIG. 2, internal center MFP 10 includes control unit 30, FAX communication unit 32, LAN (local area network) communication unit 34, display unit 36, operation unit 38, printing unit 40, scanning unit 42, and storage unit 44.

FAX communication unit 32 is a device such as a modem. FAX communication unit 32 is used for transmitting and receiving various kinds of data such as facsimile data (hereinafter called "FAX data") to and from an external device via FAX line 26.

LAN communication unit 34 is a device such as a LAN card. LAN communication unit 34 is used for transmitting and receiving various kinds of data such as Internet facsimile data (hereinafter called "I-FAX data") via intranet 12 or Internet 18.

Display unit 36 is a device such as a liquid crystal panel. Display unit 36 is used for displaying various kinds of information on a facsimile operation. When the liquid crystal panel is a touch panel, the liquid crystal panel may partially constitute operation unit 38.

Operation unit 38 is a device including a plurality of buttons, used for receiving the facsimile operation performed by a user.

Printing unit 40 is a device including a toner cartridge (not shown) and a photosensitive drum (not shown), used for printing various kinds of data such as the FAX data and the I-FAX data.

Scanning unit 42 is a scanner device including a line sensor, used for capturing an original as image data from which to generate FAX data or I-FAX data to be transmitted.

Storage unit 44 is a device such as a hard disk that stores various kinds of data such as the FAX data and the I-FAX data.

Control unit 30 is constituted by a computer including CPU (central processing unit) 46, ROM (read only memory) 48, RAM (random access memory) 50, and input/output unit 51.

CPU 46 executes a control program for the internal center MFP 10. ROM 48 is a non-volatile memory that stores the control program and data. RAM 50 is a memory that temporarily stores the control program and the data when the control program is executed, and is used as a work area. Input/output unit 51 is an interface that is used for data communication with FAX communication unit 32, LAN communication unit 34, display unit 36, operation unit 38, printing unit 40, scanning unit 42, and storage unit 44.

Control unit 30 loads the program from ROM 48 onto RAM 50, and uses CPU 46 for executing the program, to thereby function as analysis unit 52 and error processing unit 56.

Error processing unit 56 executes error processing if a first error or second error to be described later has occurred. Error processing unit 56 includes report creating unit 561 and deletion unit 562. If at least one of the first error and the second error has occurred, report creating unit 561 creates a report on the error that occurred. If the second error has occurred, deletion unit 562 deletes the data that has caused the second error.

When the control program is executed, input/output unit 51 outputs instructions to the respective devices in internal center MFP 10 to cause the respective devices to function as FAX communication unit 32, LAN communication unit 34, display unit 36, operation unit 38, printing unit 40, scanning unit 42, and storage unit 44.

Internal center MFP 10 executes a function selected from among a facsimile function (hereinafter called "FAX function"), an Internet facsimile function (hereinafter called "I-FAX function"), a printer function, a copy function, a scanner function, and a storage function.

The facsimile function includes a reception function and a transmission function. When executing the facsimile transmission function, FAX communication unit 32 transmits image data obtained by scanning unit 42 to a transmission destination such as external center MFP 22 via FAX line 26.

The facsimile reception function includes three modes, that is, a printing mode, a storage mode, and a transfer mode. One or more modes are selected via operation unit 38 among the three modes to be executed.

When executing the printing mode of the facsimile reception function, FAX communication unit 32 receives FAX data from outside via FAX line 26. Printing unit 40 creates a printed material based on the received FAX data.

When executing the storage mode of the facsimile reception function, FAX communication unit 32 receives FAX data from outside via FAX line 26. Storage unit 44 stores image data corresponding to the received FAX data.

When executing the transfer mode of the facsimile reception function, FAX communication unit 32 receives FAX data from outside via FAX line 26. FAX communication unit 32 or LAN communication unit 34 transmits the received FAX data to a set transfer destination.

The Internet facsimile function also includes a reception function and a transmission function. When executing the Internet facsimile transmission function, LAN communication unit 34 attaches image data obtained by scanning unit 42 to an electronic mail, and transmits the electronic mail to a transmission destination via LAN communication unit 34 and internal mail server 17.

The Internet facsimile reception function includes three modes, that is, a printing mode, a storage mode, and a transfer mode. One or more modes selected from among the three modes via operation unit 38 are executed.

When executing the printing mode of the Internet facsimile reception function, LAN communication unit 34 receives an attached file of electronic mail as I-FAX data from outside via internal mail server 17 and LAN communication unit 34. Printing unit 40 creates printed material based on the received I-FAX data.

When executing the storage mode of the Internet facsimile reception function, LAN communication unit 34 receives an attached file of electronic mail as I-FAX data from outside via internal mail server 17 and LAN communication unit 34. Storage unit 44 stores the received attached file.

When executing the transfer mode of the Internet facsimile reception function, LAN communication unit 34 receives an attached file of electronic mail as I-FAX data from outside via internal mail server 17 and LAN communication unit 34. LAN communication unit 34 or FAX communication unit 32 transmits the received attached file to a set transfer destination.

In the Internet facsimile reception function, in order to form an image, analysis unit 52 needs to analyze the attached file prior to the printing, storage, or transfer of the attached file. Therefore, analysis unit 52 analyzes contents of the attached file such as a file format, an image format, and an attribute of the image. Based on a result of the analysis, analysis unit 52 confirms whether or not the attached file corresponds to a printable image.

Note that, regarding the FAX data, in general, printing unit 40 may directly print the FAX data, and hence the analysis is not required for the FAX data.

Of the functions of internal center MFP 10, the storage function is a so-called box function. Storage unit 44 stores data designated by the user. By using the storage function, in the storage mode of the Internet facsimile reception function and the facsimile reception function, the attached file of the I-FAX data and the FAX data are stored in storage unit 44 as well as the image data obtained by scanning unit 42.

Note that the storage area in which the FAX data and the I-FAX data are stored, in the storage mode of the facsimile reception function and the Internet facsimile reception function, is hereinafter referred to as FAXBOX 54.

In a case of executing the facsimile reception function and the Internet facsimile reception function, there may occur a first error or a second error. The first error indicates that part of the FAX data and attached file cannot be received. The second error indicates that part of the attached file cannot be analyzed.

Further, the second error, that is, the situation that part of the attached file cannot be analyzed, includes a case where one or more attached files of a plurality of attached files cannot be analyzed, a case where part of one attached file cannot be analyzed, and a combination of the two cases. In the case where part of one attached file cannot be analyzed, the remaining part may be analyzable. The analyzable remaining part constitutes one or more pages of images when printed.

If the first error or the second error has occurred, report creating unit 561 and deletion unit 562 of error processing unit 56 each execute error processing.

The following description is given of operations performed at the time of the facsimile reception and the Internet facsimile reception involving the error processing.

Main Routine

Figure 3:
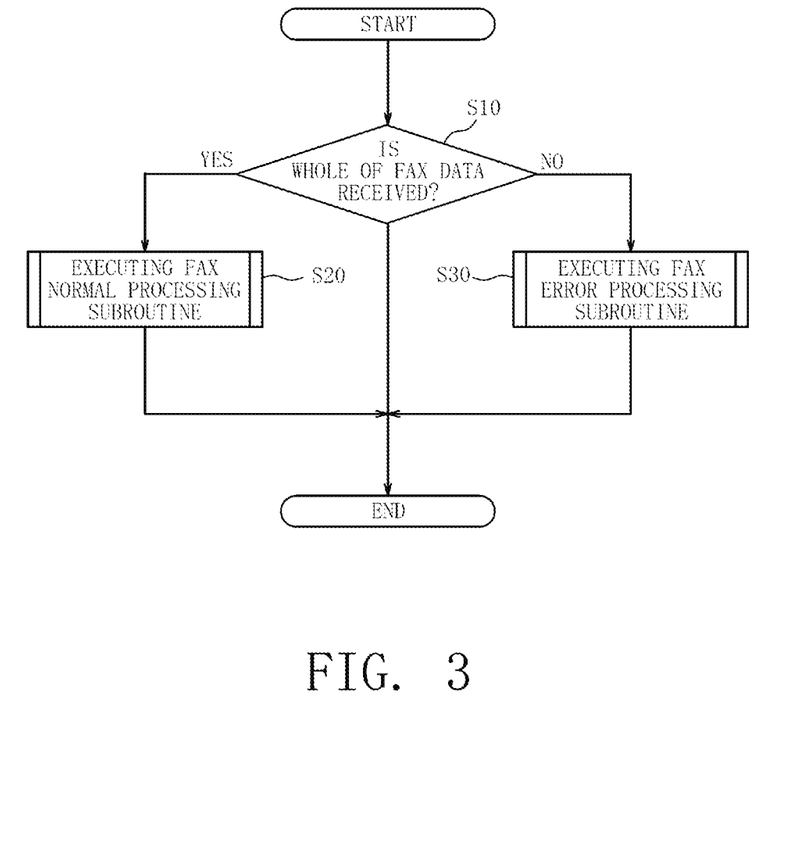
FIG. 3 shows a flow chart illustrating processing performed at the time of facsimile reception.

FIG. 3 shows a flow chart illustrating processing performed at the time of the facsimile reception. When receiving FAX data, the CPU of the control unit executes the control program for the facsimile device to implement the processing flow of FIG. 3. Note that, the control program includes a main routine, a FAX normal processing subroutine, and a FAX error processing subroutine, and is stored in the ROM or the storage unit. The flow chart illustrated in FIG. 3 corresponds to the main routine.

Step S10: If the FAX communication unit receives FAX data, the analysis unit determines whether or not the whole of the FAX data is received.

Step S20: If it is determined as a result of Step S10 that the whole of the FAX data is received ("YES"), the internal center MFP executes the FAX normal processing subroutine.

Step S30: If it is determined as a result of Step S10 that part of the FAX data is not received ("NO"), the error processing unit executes the FAX error processing subroutine.

When the execution of the FAX normal processing subroutine of Step S20 or the FAX error processing subroutine of Step S30 is finished, the main routine is brought to an end.

FAX Normal Processing Subroutine

Figure 4:
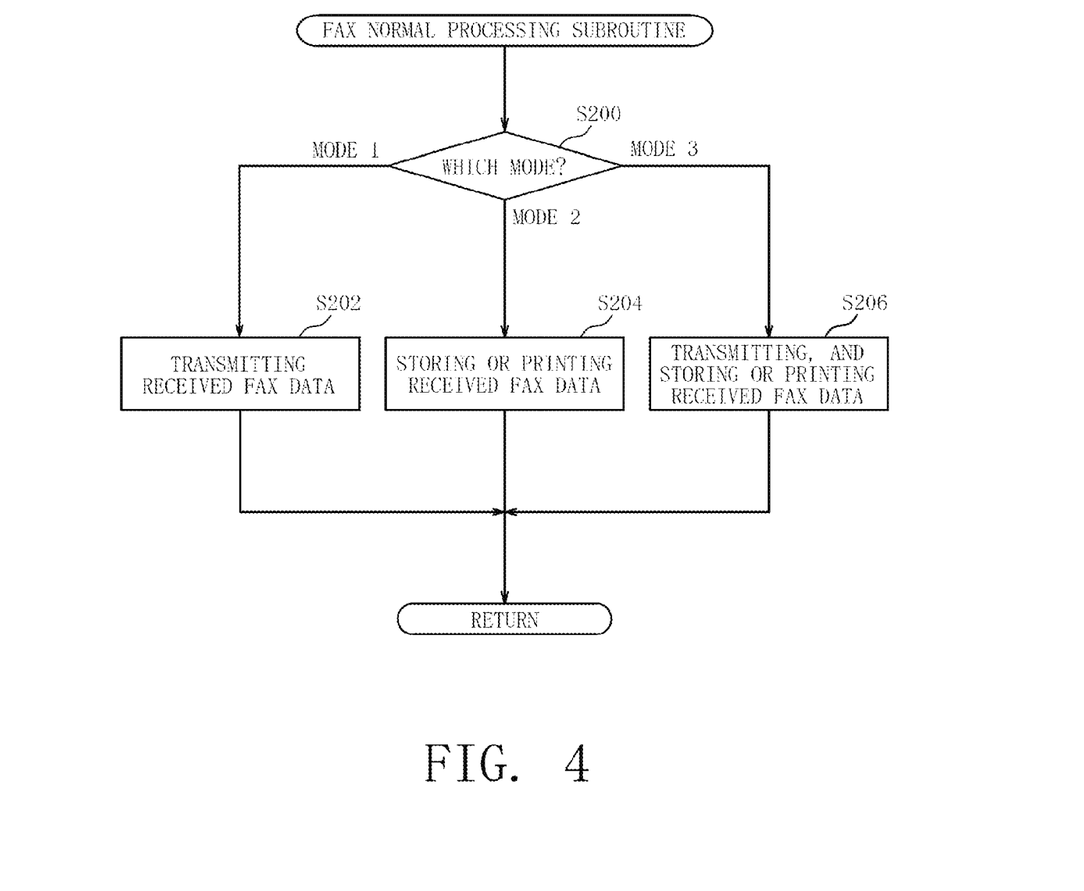
FIG. 4 shows a flow chart illustrating a FAX normal processing subroutine in the flow chart of FIG. 3.

FIG. 4 shows a flow chart illustrating the FAX normal processing subroutine in the flow chart of FIG. 3. The CPU of the control unit executes the FAX normal processing subroutine to implement the processing flow of FIG. 4.

Step S200: The control unit 30 determines which of the three modes, that is, the printing mode, the storage mode, and the transfer mode, is selected by the user.

Step S202: If it is determined as a result of Step S200 that only the transfer mode is selected (Mode 1), the FAX communication unit or the LAN communication unit transmits the received FAX data to a set transfer destination.

Step S204: If it is determined as a result of Step S200 that the storage mode or the printing mode is selected (Mode 2), the storage unit stores the received FAX data in the FAXBOX or the printing unit prints the received FAX data accordingly.

Step S206: If it is determined as a result of Step S200 that the storage mode or the printing mode is selected together with the transfer mode (Mode 3), the FAX communication unit or the LAN communication unit transmits the received FAX data to the set transfer destination. At the same time, the storage unit stores the received FAX data in the FAXBOX or the printing unit prints the received FAX data accordingly.

When Step S202, S204, or S206 is finished, the processing flow returns from the FAX normal processing subroutine to the main routine, and the main routine is brought to an end.

FAX Error Processing Subroutine

Figure 5:
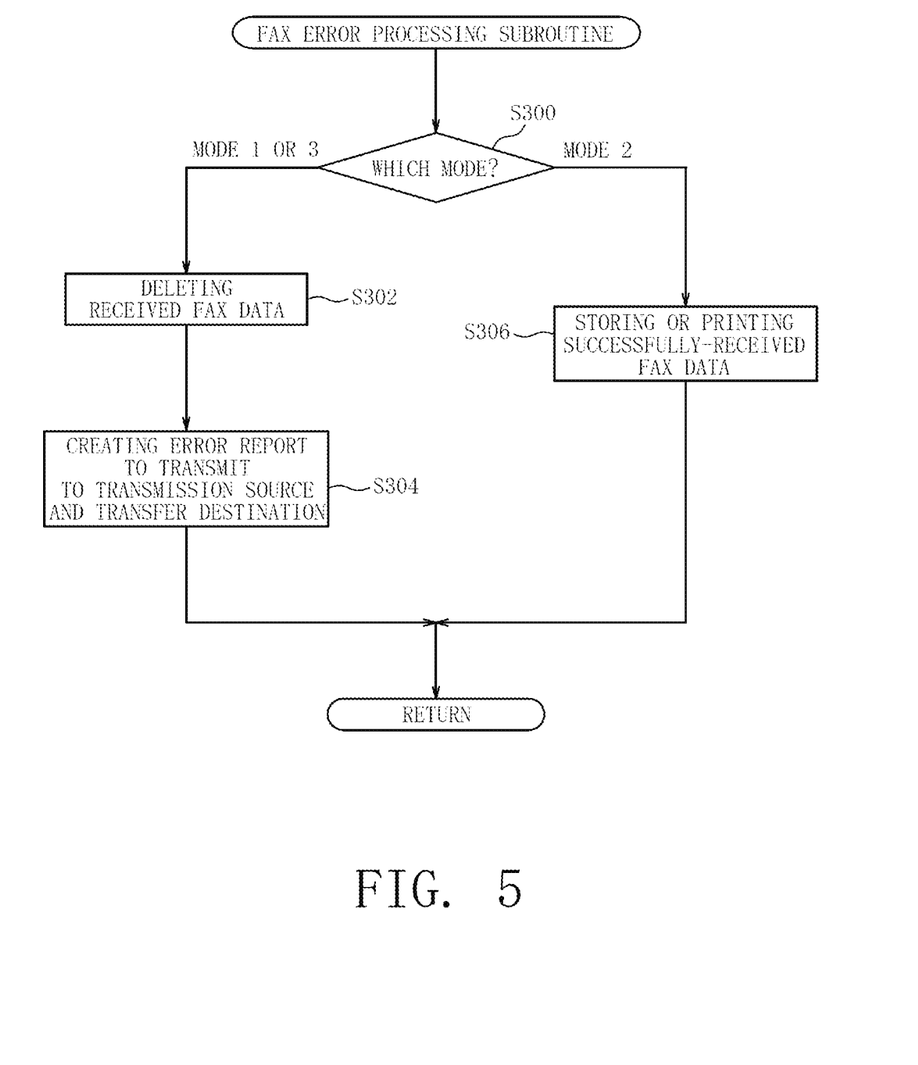
FIG. 5 shows a flow chart illustrating a FAX error processing subroutine in the flow chart of FIG. 3.

FIG. 5 shows a flow chart illustrating the FAX error processing subroutine in the flow chart of FIG. 3. The CPU of the control unit executes the FAX error processing subroutine to implement the processing flow of FIG. 5.

Step S300: The control unit determines which of the three modes, that is, the printing mode, the storage mode, and the transfer mode, is selected by the user.

Step S302: If it is determined as a result of Step S300 that only the transfer mode is selected (Mode 1), or if the storage mode or the printing mode is selected together with the transfer mode (Mode 3), the deletion unit deletes the received FAX data from the storage unit.

Step S304: Subsequently, the report creating unit creates an error report. The FAX communication unit or the LAN communication unit transmits the created error report to a transmission source and the transfer destination. The error report contains information necessary to indicate that the first error has occurred and therefore the received FAX data has been deleted. For example, the error report may describe identification information of each of the transmission source and the transfer destination, a transmission date/time, and the fact that the FAX data has been deleted.

Step S306: If it is determined as a result of Step S300 that the storage mode or the printing mode is selected (Mode 2), the storage unit stores the successfully-received FAX data in the FAXBOX or the printing unit prints the successfully-received FAX data.

When Step S304 or S306 is finished, the processing flow returns from the FAX error processing subroutine to the main routine, and the main routine is brought to an end.

Control Method for Internet Facsimile

Figure 6:
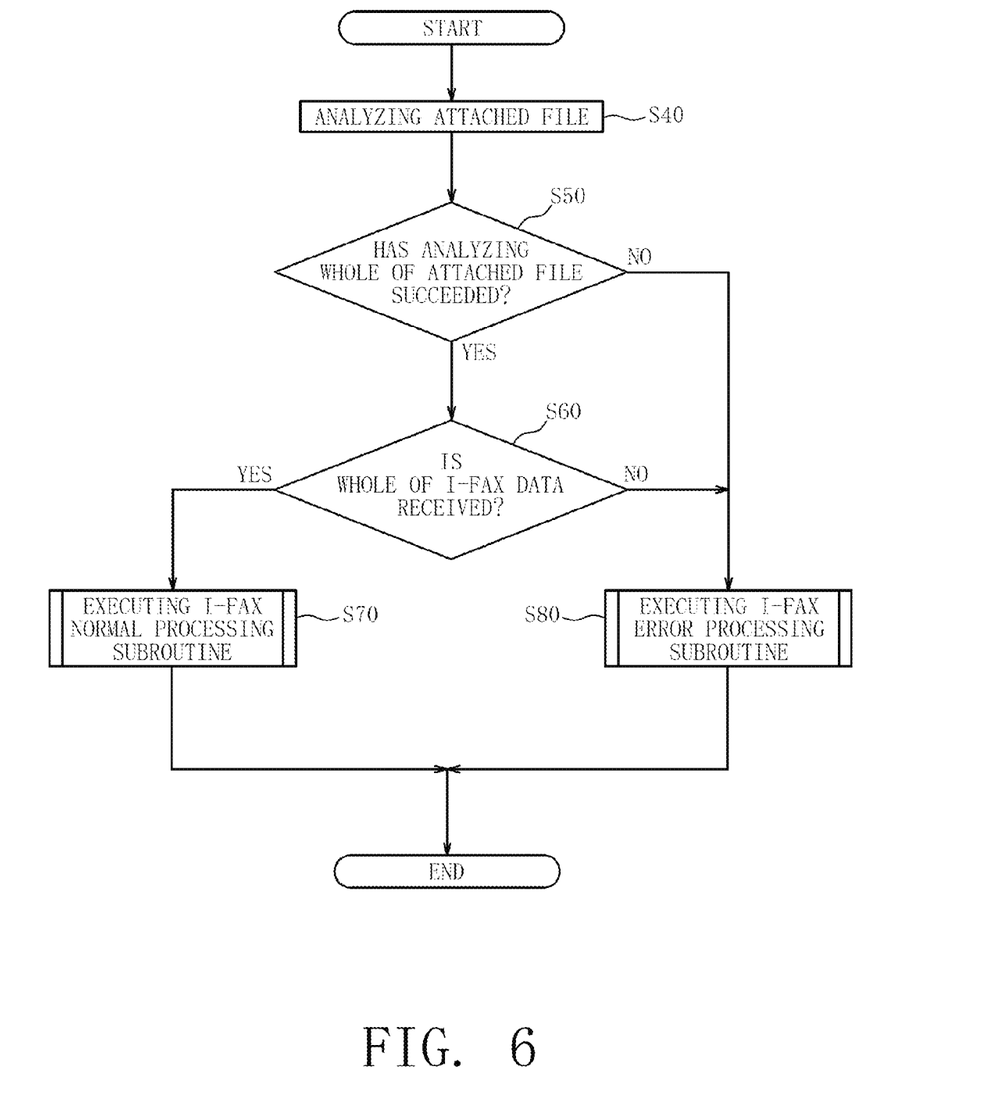
FIG. 6 shows a flow chart illustrating processing performed at a time of Internet facsimile (I-FAX) reception.

FIG. 6 shows a flow chart illustrating processing performed at the time of the Internet facsimile reception. When receiving I-FAX data, the CPU of the control unit executes the control program for the facsimile device to implement the processing flow of FIG. 6. Note that, the control program includes a main routine, an I-FAX normal processing subroutine, and an I-FAX error processing subroutine, and is stored in the ROM or the storage unit. The flow chart illustrated in FIG. 6 corresponds to the main routine.

Step S40: If the LAN communication unit receives I-FAX data, the analysis unit analyzes the attached file.

Step S50: The analysis unit determines whether or not the analysis unit has succeeded in analyzing the whole of the attached file in Step S40.

Step S60: If it is determined as a result of Step S50 that the analysis unit has succeeded in analyzing the whole of the attached file ("YES"), the analysis unit determines whether or not the whole of the I-FAX data is received.

Step S70: If it is determined as a result of Step S60 that the whole of the I-FAX data is received ("YES"), the internal center MFP executes the I-FAX normal processing subroutine.

Step S80: If it is determined as a result of Step S50 that the analysis unit has failed in analyzing part or the whole of the attached file ("NO"), or if it is determined as a result of Step S60 that part of the I-FAX data is not received ("NO"), the error processing unit executes the I-FAX error processing subroutine.

When the execution of the I-FAX normal processing subroutine of Step S70 or the I-FAX error processing subroutine of Step S80 is finished, the main routine is brought to an end.

I-FAX Normal Processing Subroutine

Figure 7:
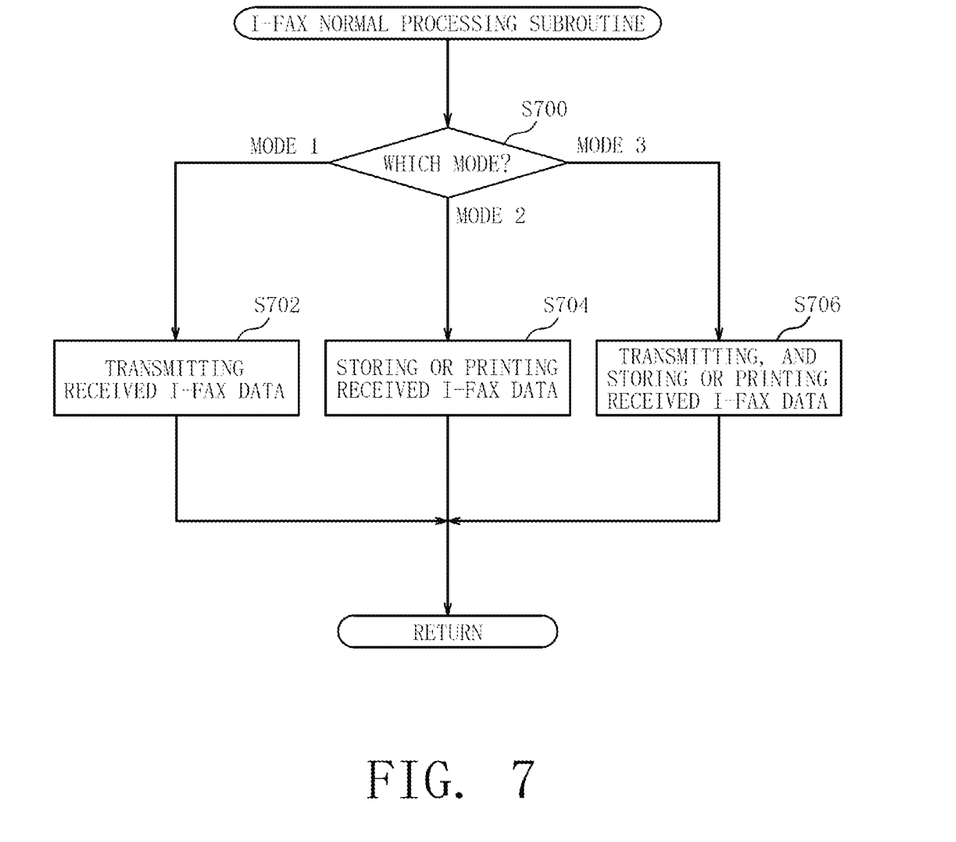
FIG. 7 shows a flow chart illustrating an I-FAX normal processing subroutine in the flow chart of FIG. 6.

FIG. 7 shows a flow chart illustrating the I-FAX normal processing subroutine in the flow chart of FIG. 6. The CPU of the control unit executes the I-FAX normal processing subroutine to implement the processing flow of FIG. 7.

Step S700: The control unit determines which of the three modes, that is, the printing mode, the storage mode, and the transfer mode, is selected by the user.

Step S702: If it is determined as a result of Step S700 that only the transfer mode is selected (Mode 1), the LAN communication unit or the FAX communication unit transmits the received I-FAX data to a set transfer destination.

Step S704: If it is determined as a result of Step S700 that the storage mode or the printing mode is selected (Mode 2), the storage unit stores the received I-FAX data in the FAX-BOX or the printing unit prints the received I-FAX data.

Step S706: If it is determined as a result of Step S700 that the storage mode or the printing mode is selected together with the transfer mode (Mode 3), the LAN communication unit or the FAX communication unit transmits the received I-FAX data to the set transfer destination. At the same time, the storage unit stores the received I-FAX data in the FAX-BOX or the printing unit prints the received I-FAX data.

When Step S702, S704, or S706 is finished, the processing flow returns from the I-FAX normal processing subroutine to the main routine, and the main routine is brought to an end.

I-FAX Error Processing Subroutine

Figure 8:
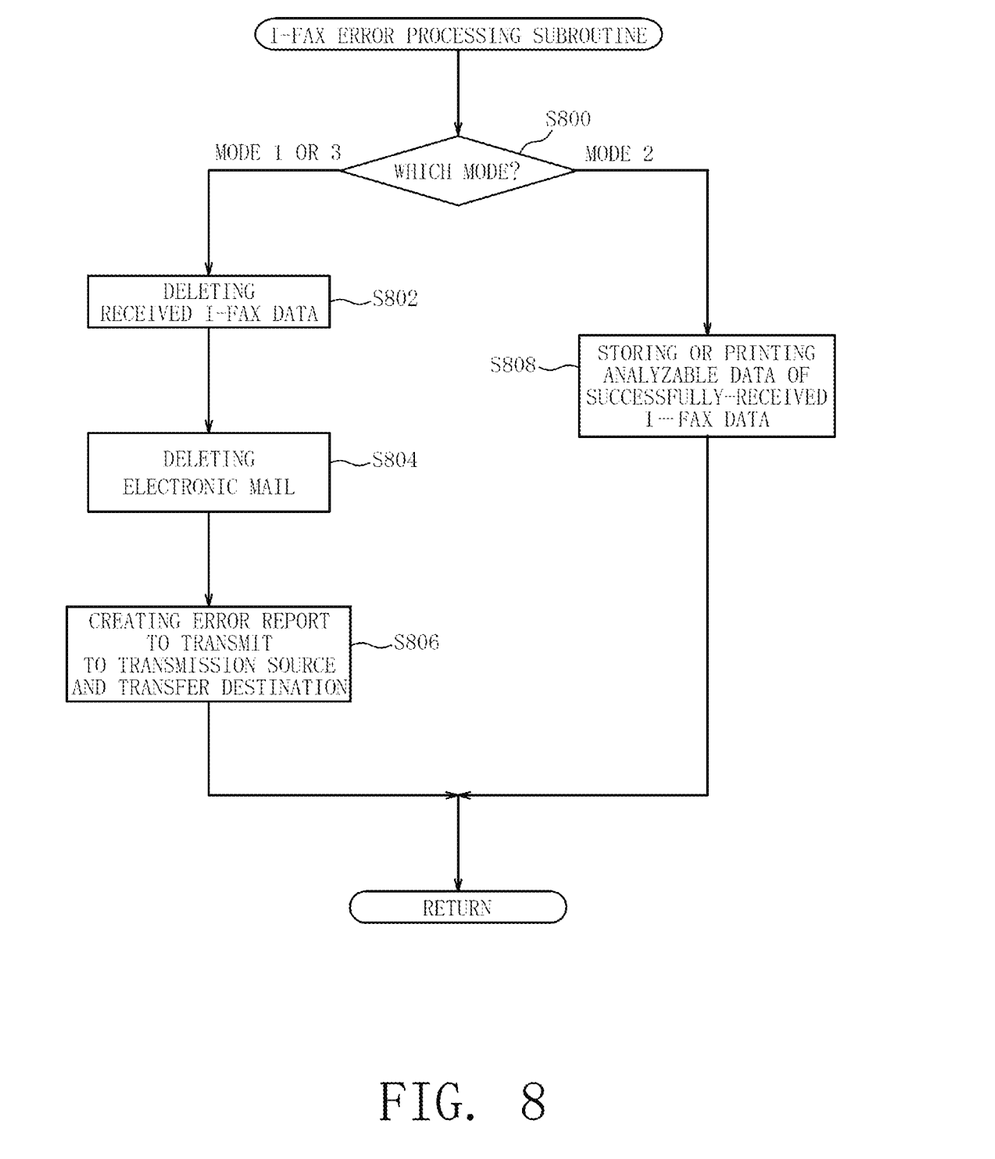
FIG. 8 shows a flow chart illustrating an I-FAX error processing subroutine in the flow chart of FIG. 6.

FIG. 8 shows a flow chart illustrating the I-FAX error processing subroutine in the flow chart of FIG. 6. The CPU of the control unit executes the I-FAX error processing subroutine to implement the processing flow of FIG. 8.

Step S800: The control unit determines which of the three modes, that is, the printing mode, the storage mode, and the transfer mode, is selected by the user.

Step S802: If it is determined as a result of Step S800 that only the transfer mode is selected (Mode 1), or if the storage mode or the printing mode is selected together with the transfer mode (Mode 3), the deletion unit deletes the received I-FAX data from the storage unit.

Step S804: Subsequently, the deletion unit transmits an instruction to delete the electronic mail to the internal mail server via the LAN communication unit.

Step S806: Further, the report creating unit creates an error report. The LAN communication unit or the FAX communication unit transmits the created error report to the transmission source and the transfer destination. The error report contains information necessary to indicate that the first error has occurred and therefore the received I-FAX data has been deleted. For example, the error report may describe identification information of each of the transmission source and the transfer destination, the transmission date/time, and the fact that the I-FAX data has been deleted.

Step S808: If it is determined as a result of Step S800 that the storage mode or the printing mode is selected (Mode 2), the storage unit stores an analyzable part (analyzable data) of the successfully-received I-FAX data in the FAXBOX or the printing unit prints the analyzable data of the successfully-received I-FAX data.

Note that, the minimum unit of the analyzable data is part of one attached file that is printable on a page basis. Therefore, even if only one attached file exists and the analysis unit has failed in the analysis thereof, analyzable data may still exist in some cases.

When Step S806 or S808 is finished, the processing flow returns from the I-FAX error processing subroutine to the main routine, and the main routine is brought to an end.

According to the internal center MFP of the above-mentioned embodiment, if the transfer mode is selected when the first error or the second error has occurred, the FAX data or I-FAX data to be transferred is not printed. Accordingly, with the internal center MFP, the printed material is not left unattended, with the result that the printed material is managed appropriately.

Further, according to the internal center MFP of the above-mentioned embodiment, the recipient of the transferred data who receives the report can immediately know of the transfer event and of the summary of the transfer. Similarly, the sender who receives the report can immediately know of the transfer failure.

Further, according to the internal center MFP of the above-mentioned embodiment, unnecessary electronic mail is prevented from being accumulated in the internal mail server.

The present disclosure is not limited to the above-mentioned embodiment, and encompasses modifications made to the above-mentioned embodiment.

The error processing executed by the internal center MFP is not limited to the error processing illustrated in FIGS. 5 and 8.

Figure 9:
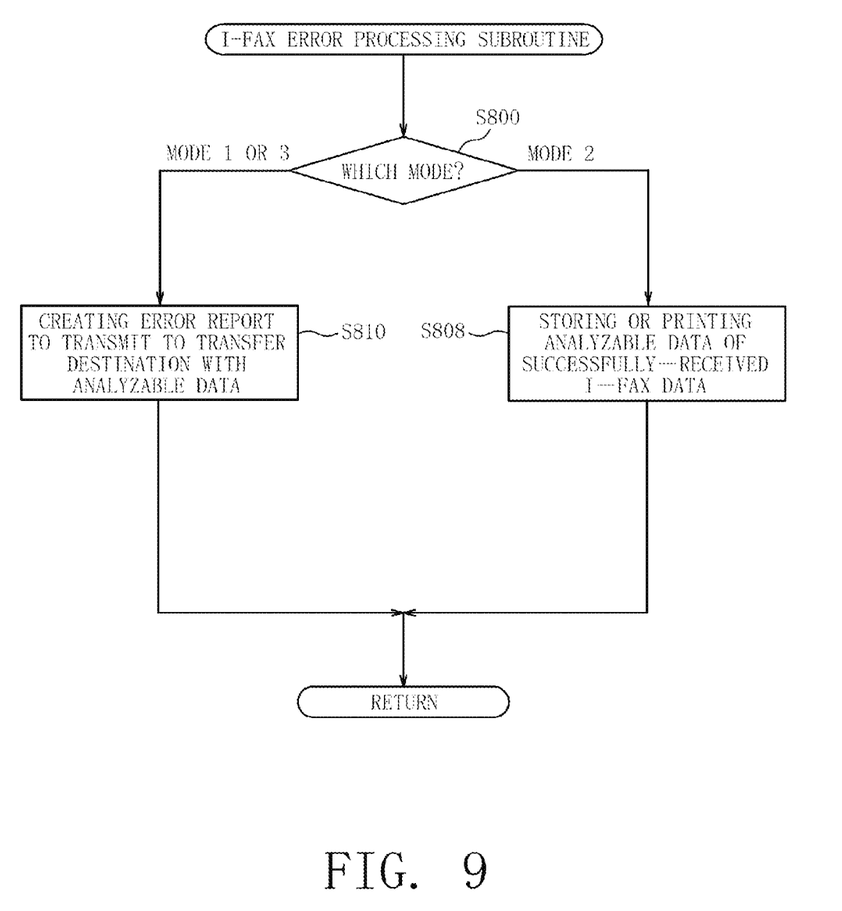
FIG. 9 shows a flow chart illustrating an I-FAX error processing subroutine according to a modified example of the present disclosure.

For example, as the error processing, the internal center MFP may execute an I-FAX error processing subroutine (second I-FAX error processing subroutine) illustrated in FIG. 9 in place of the I-FAX error processing subroutine illustrated in FIG. 8.

In the second I-FAX error processing subroutine, if it is determined as a result of Step S800 that only the transfer mode is selected (Mode 1), or if the storage mode or the printing mode is selected together with the transfer mode (Mode 3), the report creating unit creates an error report. Further, the LAN communication unit or the FAX communication unit transmits the created error report and analyzable data to the transfer destination (Step S810).

If it is determined as a result of Step S800 that the storage mode or the printing mode is selected (Mode 2), the storage unit stores an analyzable part (analyzable data) of the successfully-received I-FAX data in the FAXBOX or the printing unit prints the analyzable data of the successfully-received I-FAX data.

When Step S810 or S808 is finished, the processing flow returns from the second I-FAX error processing subroutine to the main routine, and the main routine is brought to an end.

The error report may describe, for example, a file name of the attached file whose analysis has resulted in failure, together with identification information of each of the transmission source and the transfer destination, the transmission date/time, and the like.

In this case, successfully-analyzed data is transmitted to the transfer destination, and hence the recipient of the transferred data can immediately know of the transfer event and of the summary of the transfer.

Figure 10:
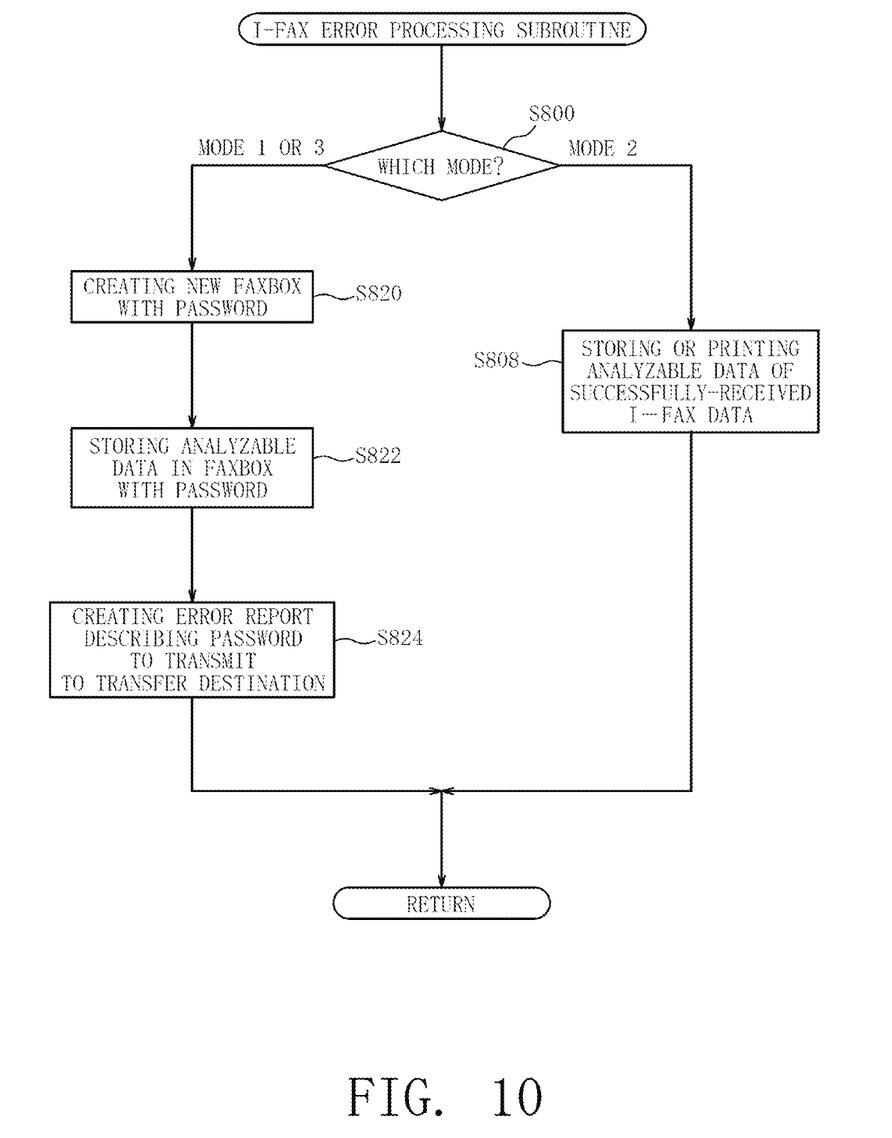
FIG. 10 shows a flow chart illustrating an I-FAX error processing subroutine according to another modified example of the present disclosure.

Further, as the error processing, the internal center MFP 10 may execute an I-FAX error processing subroutine (third I-FAX error processing subroutine) illustrated in FIG. 10 in place of the I-FAX error processing subroutine illustrated in FIG. 8 or 9.

In the third I-FAX error processing subroutine, if it is determined as a result of Step S800 that only the transfer mode is selected (Mode 1), or if the storage mode or the printing mode is selected together with the transfer mode (Mode 3), the storage unit creates a new FAXBOX with password (Step S820).

Subsequently, the storage unit stores analyzable data in the FAXBOX with password (Step S822).

Further, the report creating unit creates an error report. The LAN communication unit or the FAX communication unit transmits the created error report to the transfer destination (Step S824). The error report may describe the password assigned to the FAXBOX, together with the identification information of each of the transmission source and the transfer destination, the transmission date/time, and the like.

If it is determined as a result of Step S800 that the storage mode or the printing mode is selected (Mode 2), the storage unit stores the analyzable part (analyzable data) of the successfully-received I-FAX data in the FAXBOX or the printing unit prints the analyzable data of the successfully-received I-FAX data.

When Step S824 or S808 is finished, the processing flow returns from the third I-FAX error processing subroutine to the main routine, and the main routine is brought to an end.

In this case, the successfully-analyzed data is stored in the storage unit with the password, and hence the successfully-analyzed data is managed appropriately.

In the above-mentioned embodiment, the control program is stored in the ROM or the storage unit, but may be stored in a storage device such as a USB memory or in another recording medium such as a CD-ROM and a DVD.

In addition, the block components and control procedures described by referring to the figures are all examples, and hence, needless to say, modifications may be made thereto as appropriate when the present disclosure is embodied.

Needless to say, the present disclosure is also applicable to a facsimile device other than the MFP.

It should be understood that various changes and modifications to the presently embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. A facsimile device, comprising:
    a communication unit configured to receive, as reception data, both print-scheduled data to be printed and transfer-scheduled data to be transferred to an external device;
    an analysis unit configured to analyze a target data portion of the reception data that requires an analysis in order to form an image; and
    a printing unit configured to print a printable part of the reception data subject to an occurrence of one of a first and second error, the first error indicating that the communication unit did not receive part of the transfer-scheduled data as the reception data and the second error indicating that the analysis unit has failed in analyzing part of the target data portion corresponding to the transfer-scheduled data, wherein:
    the printing unit is configured to refrain from printing, if the reception data includes the transfer-scheduled data, the reception data corresponding to the transfer-scheduled data responsive to the occurrence of one of the first and second error;
    the printing unit is configured to print, if the reception data does not include the transfer-scheduled data but does include the print-scheduled data, the reception data corresponding to the print-scheduled data successfully received responsive to the occurrence of the first error and print the reception data corresponding to analyzable data of the print-scheduled data successfully received responsive to the occurrence of the second error; and
    the analysis unit is configured to determine the occurrence of the first and second errors.

2. The facsimile device according to claim 1, further comprising a report creating unit configured to create, responsive to the occurrence of one of the first error and the second error, a report indicating that the at least one of the first error and the second error has occurred,
    wherein the communication unit is configured to transmit the report to at least one of a transfer destination and a transmission source.

3. The facsimile device according to claim 1, wherein, if the second error has occurred, the communication unit is configured to transmit, to a transfer destination, a successfully-analyzed data portion of the reception data that corresponds to the transfer-scheduled data that is successfully analyzed by the analysis unit.

4. The facsimile device according to claim 1, further comprising a storage unit configured to store in a storage device, if the second error has occurred, a successfully-analyzed data portion of the reception data that corresponds to the transfer-scheduled data that is successfully analyzed by the analysis unit, with a password assigned thereto,
wherein the communication unit is configured to transmit the password to a transfer destination.

5. The facsimile device according to claim 1, further comprising a deletion unit configured to delete, when the transfer-scheduled data is an attached file of an electronic mail, the electronic mail from a mail server if the second error has occurred.

6. A non-transitory computer-readable recording medium that stores a control program code executed by a computer of a facsimile device, the control program code comprising:
a first sub-program code for causing the computer to communicate to an external device and receive, as reception data, both print-scheduled data to be printed and transfer-scheduled data to be transferred to the external device;
a second sub-program code for causing the computer to analyze a target data portion of the reception data that requires an analysis in order to form an image; and
a third sub-program code for causing the computer to print a printable part of the reception data subject to an occurrence of one of a first and second error, the first error indicating that part of the transfer-scheduled data is not received as the reception data and the second error indicating that the analysis of part of the target data portion corresponding to the transfer-scheduled data has resulted in failure, wherein:
the third sub-program code causes the computer to refrain from printing, if the reception data includes the transfer-scheduled data, the reception data corresponding to the transfer-scheduled data responsive to the occurrence of one of the first and second error;
the third sub-program code causes the computer to print, if the reception data does not include the transfer-scheduled data but does include the print-scheduled data, the reception data corresponding to the print-scheduled data successfully received responsive to the occurrence of the first error and print the reception data corresponding to analyzable data of the print-scheduled data successfully received responsive to the occurrence of the second error; and
the second sub-program code causes the computer to determine the occurrence of the first and second errors.

7. The non-transitory computer-readable recording medium according to claim 6, wherein the control program code further comprises:
a fourth sub-program code for causing the computer to create, responsive to the occurrence of one of the first error and the second error, a report indicating that the at least one of the first error and the second error has occurred; and
a fifth sub-program code for causing the computer to transmit the report to at least one of a transfer destination and a transmission source.

8. The non-transitory computer-readable recording medium according to claim 6, wherein the control program code further comprises a sixth sub-program code for causing the computer to transmit, if the second error has occurred, to a transfer destination, a successfully-analyzed data portion of the reception data that corresponds to the transfer-scheduled data that is successfully analyzed under the second sub-program code.

9. The non-transitory computer-readable recording medium according to claim 6, wherein the control program code further comprises:
a seventh sub-program code for causing the computer to store in a storage device, if the second error has occurred, a successfully-analyzed data portion of the reception data that corresponds to the transfer-scheduled data that is successfully analyzed under the second sub-program code, with a password assigned thereto; and
an eighth sub-program code for causing the computer to transmit the password to a transfer destination.

10. The non-transitory computer-readable recording medium according to claim 6, wherein the control program code further comprises a ninth sub-program code for causing the computer to delete, when the transfer-scheduled data is an attached file of an electronic mail, the electronic mail from a mail server if the second error has occurred.

11. A control method for a facsimile device, comprising:
a communication unit receiving, as reception data, both print-scheduled data to be printed and transfer-scheduled data to be transferred to an external device;
an analysis unit analyzing a target data portion of the reception data that requires an analysis in order to form an image; and
a printing unit printing a printable part of the reception data subject to an occurrence of one of a first and second error, the first error indicating that the communication unit did not receive part of the transfer-scheduled data as the reception data and the second error indicating that the analysis unit has failed in analyzing part of the target data portion corresponding to the transfer-scheduled data, wherein:
if the reception data includes the transfer-scheduled data, the printing unit refrains from printing the reception data corresponding to the transfer-scheduled data responsive to the occurrence of one of the first and second error;
if the reception data does not include the transfer-scheduled data but does include the print-scheduled data, the printing unit prints the reception data corresponding to the print-scheduled data successfully received responsive to the occurrence of the first error and prints the reception data corresponding to analyzable data of the print-scheduled data successfully received responsive to the occurrence of the second error; and
the analysis unit determines the occurrence of the first and second errors.

12. The control method for a facsimile device according to claim 11, further comprising:
a report creating unit creating, responsive to the occurrence of one of the first error and the second error, a report indicating that at least one of the first error and the second error has occurred; and
the communication unit transmitting the report to at least one of a transfer destination and a transmission source.

13. The control method for a facsimile device according to claim 11, further comprising the communication unit transmitting, if the second error has occurred, to a transfer destination, a successfully-analyzed data portion of the reception data that corresponds to the transfer-scheduled data that is successfully analyzed by the analysis unit.

14. The control method for a facsimile device according to claim 11, further comprising:
- a storage unit storing in a storage device, if the second error has occurred, a successfully-analyzed data portion of the reception data that corresponds to the transfer-scheduled data that is successfully analyzed by the analysis unit, with a password assigned thereto; and
- the communication unit transmitting the password to a transfer destination.

15. The control method for a facsimile device according to claim 11, further comprising a deletion unit deleting, in a case where the transfer-scheduled data is an attached file of an electronic mail, the electronic mail from a mail server if the second error has occurred.

16. A facsimile device, comprising:
- communication means for receiving, as reception data, both print-scheduled data to be printed and transfer-scheduled data to be transferred to an external device;
- analysis means for analyzing a target data portion of the reception data that requires an analysis in order to form an image; and
- printing means for printing a printable part of the reception data subject to an occurrence of one of a first and second error, the first error indicating that the communication means did not receive part of the transfer-scheduled data as the reception data and the second error indicating that the analysis means has failed in analyzing part of the target data portion corresponding to the transfer-scheduled data, wherein:
- the printing means is configured to refrain from printing, if the reception data includes the transfer-scheduled data, the reception data corresponding to the transfer-scheduled data responsive to the occurrence of one of the first and second error;
- the printing means is configured to print, if the reception data does not include the transfer-scheduled data but does include the print-scheduled data, the reception data corresponding to the print-scheduled data successfully received responsive to the occurrence of the first error and print the reception data corresponding to analyzable data of the print-scheduled data successfully received responsive to the occurrence of the second error; and
- the analysis means is configured to determine the occurrence of the first and second errors.

17. The facsimile device according to claim 16, further comprising a report creating means for creating, responsive to the occurrence of one of the first error and the second error, a report indicating that the at least one of the first error and the second error has occurred,
- wherein the communication means transmits the report to at least one of a transfer destination and a transmission source.

18. The facsimile device according to claim 16, wherein, if the second error has occurred, the communication means for transmitting, to a transfer destination, a successfully-analyzed data portion of the reception data that corresponds to the transfer-scheduled data that is successfully analyzed by the analysis means.

19. The facsimile device according to claim 16, further comprising a storage means for storing, if the second error has occurred, a successfully-analyzed data portion of the reception data that corresponds to the transfer-scheduled data that is successfully analyzed by the analysis means, with a password assigned thereto,
- wherein the communication means is configured to transmit the password to a transfer destination.

20. The facsimile device according to claim 16, further comprising a deletion means for deleting, in a case where the transfer-scheduled data is an attached file of an electronic mail, the electronic mail from a mail server if the second error has occurred.

* * * * *